(12) United States Patent
Norris et al.

(10) Patent No.: US 8,176,725 B2
(45) Date of Patent: May 15, 2012

(54) REVERSED-FLOW CORE FOR A TURBOFAN WITH A FAN DRIVE GEAR SYSTEM

(75) Inventors: Jams W. Norris, Lebanon, CT (US); Alan Epstein, Lexington, MA (US); Gary D. Roberge, Tolland, CT (US); Mark W. Costa, Storrs, CT (US); Andrew P. Berryann, Coventry, CT (US); Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 310 days.

(21) Appl. No.: 12/556,359

(22) Filed: Sep. 9, 2009

(65) Prior Publication Data

US 2011/0056208 A1    Mar. 10, 2011

(51) Int. Cl.
*F02K 3/02*     (2006.01)

(52) U.S. Cl. .......................................... 60/226.1; 60/761

(58) Field of Classification Search .................. 60/226.1, 60/262, 268, 269, 792
See application file for complete search history.

(56) References Cited

U.S. PATENT DOCUMENTS

| | | | | |
|---|---|---|---|---|
| 2,430,398 A | * | 11/1947 | Heppner | 60/264 |
| 2,504,181 A | * | 4/1950 | Constant | 60/226.1 |
| 2,548,975 A | * | 4/1951 | Hawthorne | 60/268 |
| 3,589,132 A | * | 6/1971 | Du Pont | 60/262 |
| 3,756,672 A | | 9/1973 | Hibner et al. | |
| 3,765,179 A | | 10/1973 | Strang et al. | |
| 4,141,212 A | | 2/1979 | Koschier | |
| 4,497,171 A | | 2/1985 | Corrigan et al. | |
| 4,567,724 A | | 2/1986 | Mongia et al. | |
| 4,640,091 A | | 2/1987 | Blizzard | |
| 4,687,412 A | | 8/1987 | Chamberlain | |
| 4,827,712 A | * | 5/1989 | Coplin | 60/226.1 |
| 5,105,618 A | * | 4/1992 | Lardellier | 60/226.1 |
| 5,181,728 A | * | 1/1993 | Stec | 277/355 |
| 5,237,817 A | * | 8/1993 | Bornemisza et al. | 60/226.1 |
| 5,433,674 A | | 7/1995 | Sheridan et al. | |
| 5,485,717 A | | 1/1996 | Williams | |
| 5,832,715 A | * | 11/1998 | Dev | 60/804 |
| 5,937,633 A | | 8/1999 | Wang | |
| 6,092,361 A | | 7/2000 | Romani | |
| 6,233,616 B1 | | 5/2001 | Reid | |
| 6,846,158 B2 | | 1/2005 | Hull | |
| 7,062,900 B1 | | 6/2006 | Brun | |
| 7,299,621 B2 | | 11/2007 | Bart et al. | |
| 7,309,210 B2 | | 12/2007 | Suciu et al. | |
| 7,882,693 B2 | * | 2/2011 | Schilling | 60/204 |

(Continued)

OTHER PUBLICATIONS

Honeywell ATF3 Rotor Layout—1 page.

*Primary Examiner* — Louis Casaregola
*Assistant Examiner* — Phutthiwat Wongwian
(74) *Attorney, Agent, or Firm* — Kinney & Lange, P.A.

(57) ABSTRACT

A gas turbine engine comprises a fan drive gear system, a low spool connected to the fan drive gear system, and a high spool disposed aft of the low spool. The low spool comprises a rearward-flow low pressure compressor disposed aft of the fan drive gear system, and a forward-flow low pressure turbine disposed aft of the low pressure compressor. The high spool comprises a forward-flow high pressure turbine disposed aft of the low pressure turbine, a combustor disposed aft of the high pressure turbine, and a forward-flow high pressure compressor disposed aft of the combustor.

20 Claims, 2 Drawing Sheets

U.S. PATENT DOCUMENTS

| | | |
|---|---|---|
| 7,950,237 B2 * | 5/2011 | Grabowski et al. ............ 60/771 |
| 2005/0060983 A1 * | 3/2005 | Lardellier .................... 60/226.1 |
| 2006/0137355 A1 * | 6/2006 | Welch et al. ................... 60/772 |
| 2007/0245710 A1 | 10/2007 | Schumacher et al. |
| 2008/0200299 A1 | 8/2008 | Russ |
| 2009/0007569 A1 | 1/2009 | Lemmers, Jr. et al. |
| 2010/0037623 A1 * | 2/2010 | Jewess et al. ................... 60/770 |

* cited by examiner

REVERSED-FLOW CORE FOR A TURBOFAN WITH A FAN DRIVE GEAR SYSTEM

BACKGROUND

The present invention is directed to multi-spool gas turbine engines and, in particular, to gas turbine engines having a reverse flow spool. Typical multi-spool turbofan gas turbine engines include a nested core, in which a high pressure, or core, spool is nested inside a low pressure spool. Such a nested core engine includes, in axial sequence, a low pressure compressor, a high pressure compressor, a combustor section, a high pressure turbine, and a low pressure turbine. The high pressure compressor is connected to the high pressure turbine with a high pressure shaft that extends through the combustor section. The low pressure compressor is connected to the low pressure turbine with a low pressure shaft that extends through the high pressure shaft. Increases in efficiency of the turbofan allow for the core to be reduced in size, such as by having a smaller diameter. The low pressure shaft, however, cannot be reduced in diameter because the rotational speeds of the low pressure spool are limited by critical speed. The shaft critical speed is proportional to the shaft diameter and inversely proportional to the shaft length. Thus, decreasing the shaft diameter with reduced core sizes is not possible without reducing the shaft length if the same critical speed is desired. Thus, reductions in the core size yield compromises in the high pressure spool to accommodate low pressure spool shaft diameters. For example, the size and weight of high pressure spool rotor disk need to be increased to accommodate openings for larger low pressure shaft sizes. As such, there is a need for improving engine architectures to allow for, among other things, decreased core sizes resulting from more efficient turbofan engines.

SUMMARY

The present invention is directed to a gas turbine engine comprising a fan drive gear system, a low spool connected to the fan drive gear system, and a high spool disposed aft of the low spool. The low spool comprises a rearward-flow low pressure compressor disposed aft of the fan drive gear system, and a forward-flow low pressure turbine disposed aft of the low pressure compressor. The high spool comprises a forward-flow high pressure turbine disposed aft of the low pressure turbine, a combustor disposed aft of the high pressure turbine, and a forward-flow high pressure compressor disposed aft of the combustor.

DETAILED DESCRIPTION

Figure 1:
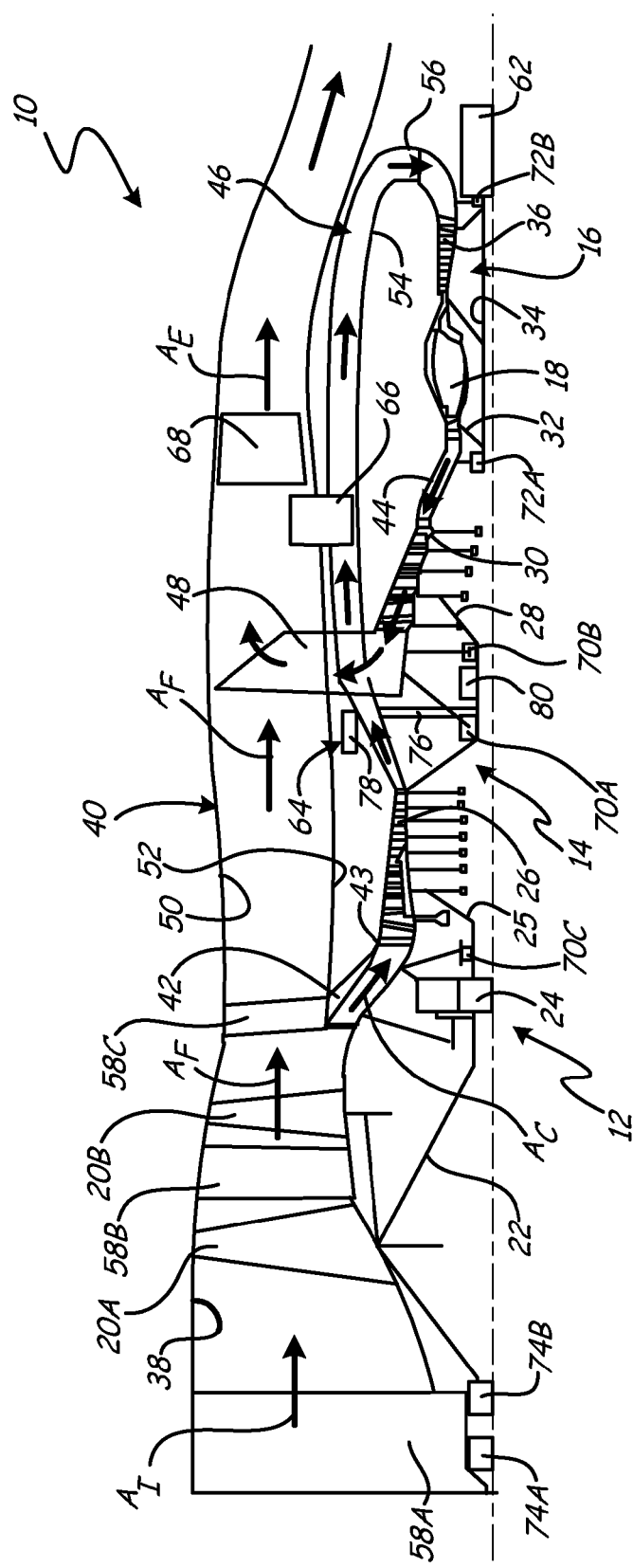
FIG. 1 is a schematic cross-sectional view of a two-and-a-half spool turbofan engine having a reversed flow axial core.

FIG. 1 is a schematic cross-sectional view of two-and-a-half spool turbofan engine 10 having fan drive gear system 12, cross-flow low pressure spool 14, reversed-flow high pressure spool 16 and combustor section 18. Fan drive gear system 12 includes fan blades 20A and 20B, fan shaft 22, gearbox 24 and gear shaft 25. Cross-flow low pressure spool 14 includes low pressure compressor 26, low pressure shaft 28 and low pressure turbine 30. Reversed-flow high pressure spool 16 includes high pressure turbine 32, high pressure shaft 34 and high pressure compressor 36. As such, turbofan engine 10 comprises a 2.5 spool engine: two spools represented by cross-flow low pressure spool 14 and reversed-flow high pressure spool 16, and a half-spool represented by fan drive gear system 12. Using various ductwork, turbofan engine 10 routes air and gas through fan drive gear system 12, low pressure spool 14 and high pressure spool 16 to efficiently produce thrust in an axially and radially compact engine architecture.

Engine 10 also includes fan case 38, exhaust duct 40, flow splitter 42, compressor case 43, core engine case 44, reverse duct 46 and exhaust pipe 48 for directing flow of air through fan drive gear system 12, low pressure spool 14, high pressure spool 16 and combustor section 18. Fan case 38 surrounds fan blades 20A and 20B. Exhaust duct 40, which includes outer cowling 50 and inner cowling 52, extends from fan case 38 to the rear of engine 10. Flow splitter 42 is positioned at the upstream end of inner cowling 52. High pressure spool 16 is surrounded by engine case 44. Reverse duct 46, which is disposed between inner cowling 52 and engine case 44, comprises inner cowling 54 and outer cowling 56. Engine 10 also includes guide vanes 58A-58C, high spool accessory gearbox system 62, low spool accessory gearbox system 64, heat exchanger 66, augmenter 68, low spool bearings 70A, 70B and 70C, high spool bearings 72A and 72B, fan bearings 74A and 74B, tower shaft 76, gearbox 78 and balance piston 80.

Inlet air $A_I$ enters engine 10 through inlet guide vane 58A, passes through fan blade 20A, guide vane 58B and fan blade 20B, where flow splitter 42 divides inlet air $A_I$ into fan air $A_F$ and core air $A_C$. Fan blades 20A and 20B accelerate inlet air $A_I$ to produce fan air $A_F$, which produces a majority of the thrust generated by engine 10. Fan air $A_F$ continues past guide vane 58C and into exhaust duct 40 between outer cowling 50 and inner cowling 52. A portion of inlet air $A_I$, core air $A_C$, is diverted from fan air $A_F$ to provide air for operating low pressure spool 14 and high pressure spool 16. Using compressor case 43, core air $A_C$ flows into low pressure compressor 26. Compressor case 43 extends from flow splitter 42 to the inlet of compressor 26, and continues to the outlet of compressor 26. Low pressure compressor 26, which is driven through low pressure shaft 28 by low pressure turbine 30, compresses core air $A_C$ in the axially downstream direction. Compressed core air $A_C$ from compressor 26 is routed into reverse duct 46 from compressor case 43.

Reverse duct 46 extends radially outward from the outlet of compressor 26 and extends axially past low pressure turbine 30 and high pressure spool 16, where duct 46 turns radially inward toward high pressure spool 16. Reverse duct 46 includes an elbow or bend that turns reverse duct one-hundred-eighty degrees. High pressure spool 16 and low pressure turbine 30 are bounded by core engine case 44. The outlet of reverse duct 46 connects to the inlet of core engine case 44 to direct core air $A_C$ from low pressure compressor 26 into high pressure compressor 36. High pressure compressor 36 compresses core air $A_C$ in the axially upstream direction before being passed into combustor section 18 while still flowing in the upstream direction. Within combustor section 18, core air $A_C$ is mixed with a fuel from a fuel system (not shown) and ignited to produce high energy gases for turning turbines 32 and 30. From combustor section 18, core air $A_C$ travels into high pressure turbine 32 and into low pressure turbine 30. As such, core air $A_C$ flows in an axially upstream direction from high pressure compressor 36 to low pressure turbine 30.

Flow of core air $A_C$ through turbines 32 and 30 provides rotational power to compressor 36 and compressor 26, respectively, to provide the compressed air necessary for producing and sustaining combustion within combustor section 18. Low pressure compressor 26 is driven by low pressure turbine 30 through low pressure shaft 28. High pressure compressor 36 is driven by high pressure turbine 32 through high pressure shaft 34, which extends through combustor section 18. Furthermore, rotation of low pressure compressor 26 produces rotation of fan blades 20A and 20B through gearbox 24, fan shaft 22 and gear shaft 25. Gearbox 24 comprises a gear system that steps down the rotational output of compressor 26 such that fan shaft 22 rotates at a lower speed than low pressure shaft 28. In one embodiment, gearbox 24 comprises an epicyclic gear system. In one such embodiment, gear shaft 25 is connected to a sun gear and fan shaft 22 is connected to a ring gear, with a plurality of star gears being disposed between the sun gear and the ring gear. The star gears are mounted on bearing pins that are connected to a gear carrier that is stationarily affixed to engine 10. As such, fan shaft 22 rotates slower than gear shaft 25 as the star gears rotate between the sun gear and ring gear. Such epicyclic gear systems are described in U.S. Pat. No. 6,223,616 to Sheridan, U.S. Pat. App. No. 2009/0056306 to Suciu et al., and U.S. Pat. App. No. 2009/0090096 to Sheridan, each of which is assigned to United Technologies Corporation, Hartford, Conn., and is incorporated by this reference. In another embodiment of the invention discussed with reference to FIG. 2, engine 10 comprises a three spool system in which low pressure turbine 30 is split into two turbines, one for directly powering low pressure compressor 26, and one for directly powering gearbox 24.

From low pressure turbine 30, core air $A_C$ is directed radially outward by exhaust pipe 48. The inlet of exhaust pipe 48 connects to engine case 44 and the outlet is disposed within exhaust duct 40. Exhaust pipe 48 comprises one of a plurality of ducts or vents having generally rectangular cross-sections that extend through inner cowling 52. Exhaust pipe 48 extends radially through inner and outer cowlings 54 and 56 of reverse duct 46. The outlet of exhaust pipe 48 is angled such that core air $A_C$ is able to leave exhaust pipe 48 in an axially downstream direction. In one embodiment, the outlet of exhaust pipe 48 is angled at forty-five degrees with respect to the axial direction. Core air $A_C$ leaves exhaust pipe 48 and enters exhaust duct 40 where core air $A_C$ becomes entrained and mixed with fan air $A_F$. Exhaust air $A_E$ is discharged out of the outlet end of exhaust duct 40 to exit engine 10.

Engine 10 comprises a fan drive gear system in conjunction with a reversed-flow high pressure spool and a cross-flow low pressure spool. Low pressure spool 14 comprises rearward-flow compressor 26 and forward-flow turbine 30, both of which are disposed axially forward of combustor section 18. High pressure spool 16 comprises forward-flow high pressure turbine 32 and forward-flow high pressure compressor 36, which are disposed axially forward and aft of combustor section 18, respectively. Configured as such, engine 10 achieves size, space and performance improvements as compared to conventional two spool turbofan engines without reversed-flow spool 16 and fan drive gear system 12.

In one embodiment, high pressure spool 16 comprises a center-tie core, as is described in U.S. Pat. No. 7,309,210 by Suciu and Norris, which is assigned to United Technologies Corporation. However, high pressure turbine 32 and high pressure compressor 36 can be individually configured as center-tie rotors. High pressure spool 16 can also be configured using other, conventional rotor assemblies. In the embodiment of the invention shown, high pressure compressor 36 comprises an axial flow compressor, in which a series of rotating blades force air or gas through a series of stationary vanes in an axial direction. For example, compressor 36 comprises a series of disks, center-tied or otherwise, positioned between a pair of rotors connected to shaft 34. A plurality of blades extend from the disks and a plurality of vanes extend from engine duct 44 to form a flow path having a decreasing cross-sectional area in the direction of flow. Axial flow compressors are capable of efficiently producing large pressure ratios in radially compact designs, particularly as compared to radial or centrifugal compressors.

The length of low pressure shaft 28 is significantly reduced as the need to pass through high pressure spool 16 is eliminated. The reduced length of shaft 28 further permits the diameter of shaft 28 to be reduced without sacrificing critical speed margin. Without the need to accommodate shaft 28, the diameter of high pressure spool 16 can also be reduced. Thus, the size and weight of rotors and disks comprising high pressure turbine 32 and high pressure compressor 36 can be reduced. Reducing the size of components within engine 10 correspondingly reduces costs associated with manufacturing parts from high strength engine alloys.

Engine 10 also allows for weight and cost reductions by eliminating the need for large, expensive bearings. High pressure spool 16 is supported at various positions along high pressure shaft 34 by bearings 72A and 72B. In conventional flow gas turbine engines, the bearings are typically custom made. Reducing the size of high pressure spool 16 allows for reductions in the size of high pressure shaft 34, which enables the size of the bearings needed to support shaft 34 to also be reduced. Bearings are rated to a DN number, the diameter of the bearing multiplied by the speed at which the bearing will rotate in use. Lower rated bearings can be used if the critical speed of high pressure shaft 34 is maintained constant while the diameter of the bearing is reduced as the diameter of shaft 34 is reduced. Thus, smaller, lighter and less technically advanced bearings may be used to support shaft 34, which are typically less expensive than larger and heavier custom bearings.

The reduced size of high pressure spool 16 allows for the rotational speed of high pressure shaft 34 to be increased without increasing high compressor blade tip speeds to unacceptable levels. As such, a high overall pressure ratio within engine 10 can be maintained. Thus, when combined with fan drive gear system 12, engine 10 is able to efficiently generate a large proportion of overall thrust from fan blades 20A and 20B, which improves fuel efficiency and reduces engine noise. The reduced size of engine 10 also provides other structural benefits. For example, a reduction in the length of low pressure shaft 28 reduces the likelihood of undesirable flexing of shaft 28. This is particularly advantageous when engine 10 is used in aircraft involved in aircraft carrier operations where touchdown events give rise to shaft flexures.

The ductwork that encapsulates low pressure spool 14 and high pressure spool 16 also provides benefits and advantages to engine 10. Exhaust air $A_E$ comprises a mixture of fan air $A_F$ and hotter core air $A_C$. The mixed air reduces the overall temperature signature of exhausted gases, which reduces the infrared (IR) signature of engine 10. Furthermore, reverse duct 46 encapsulates combustor section 18 within engine 10 such that the line-of-sight of low pressure spool 14 and high pressure spool 16 is obstructed, further reducing the IR signature. The encapsulation of high pressure spool 16 and low pressure spool 14 also reduces the radar signature of engine 10 as the blades of the turbines are shielded from the line-of-sight of radar signals. Release of exhaust from engine 10 is improved by mixing of core air $A_C$ from exhaust pipe 48 and fan air $A_F$ within exhaust duct 40, which reduces exhaust gas noise as the two gas streams are mixed within the engine before exiting. Additionally, core air $A_C$ directly leaving combustor 18 is facing axially upstream into engine 10 rather than being directly exhausted from the engine. All of these benefits reduce the need for providing engine 10 with specialized exhaust nozzles and cowling for reducing noise, heat and IR signatures. The ductwork surrounding engine 10 also provides other structural benefits. For example, exhaust duct 40 and reverse duct 46 provide an exoskeleton to engine 10 that reduces shaft bending within engine 10, and can be used to provide support for accessories mounted to engine 10.

FIG. 1 shows schematically the positions of various sub-systems used within engine 10. Engine 10 includes high spool accessory gearbox system 62, low spool accessory gearbox system 64, heat exchanger 66, augmenter 68, low spool bearings 70A, 70B and 70C, high spool bearings 72A and 72B, fan spool bearings 74A and 74B, tower shaft 76, gearbox 78 and balance piston 80. The architecture of low pressure shaft 28 and high pressure shaft 34, as well as exhaust duct 40 and reverse duct 46 allow such subsystems, such as heat exchanger 66, augmenter 68 and gearbox system 62, to be advantageously mounted within engine 10.

Engine 10 includes accessory gearbox systems 62 and 64 for providing power to various sub-systems within engine 10. For example gearbox systems 62 and 64 can be used to drive generators for providing electrical power to engine 10 or the aircraft in which the engine is used. By configuring high pressure spool 16 as a reversed-flow spool and low pressure spool 14 as a cross-flow spool, both high pressure shaft 34 and low pressure shaft 28 are easily accessible within engine 10. Because shaft 34 is not concentrically enshrouded within a low pressure spool shaft, power can be taken directly from high pressure spool 16. Furthermore, high pressure shaft 34 is positioned at the rear of engine 10 away from the flow of hot gases exiting combustor section 18 and turbines 30 and 32. As such, shaft 34 can be directly accessed from the rear of engine 10 without disassembly. Also, the rearward end of shaft 34 is accessible such that power can be taken axially from shaft 34 without use of gear trains and shafts for changing the rotational orientation of shaft 34. For example, use of bevel gears or tower shafts is eliminated. However, conventional accessory gear trains can still be used to obtain power from low pressure shaft 28 or high pressure shaft 34. For example, an accessory gearbox can be conventionally connected to shaft 28 using tower shaft 76 and angle gearbox 78. Other suitable accessory gearbox assemblies for use with generators in the engine of present invention are described in U.S. Pat. App. No. 2009/0007569 to Lemmers, Jr. et al., and U.S. Pat. App. No. 2008/0200299 to Russ, both of which are assigned to United Technologies Corporation and are incorporated by this reference.

Engine 10 also facilitates easy use of inter-cooling and recuperating. Inter-cooling involves lowering the temperature of core air $A_C$ between low pressure compressor 26 and high pressure compressor 36 such that the amount of work required to compress the air is reduced. Inter-cooling is typically performed during take-off or other high heat operations to cool compressor air. Conventionally, inter-cooling is obtained within gas turbine engines by the use of heat exchangers that are positioned to receive airflow between the low pressure compressor and the high pressure compressor. Such systems require the use of additional ductwork and a heat exchanger, which add weight and expense to the engine system. In the present invention, the configuration of reverse duct 46 between low pressure compressor 26 and high pressure compressor 36 provides an integrated inter-cooling duct. Specifically, the time it takes core air $A_C$ to travel through duct 46 provides an opportunity for core air $A_C$ to cool on its own accord. Furthermore, the proximity of reverse duct 46 and exhaust duct 40 allows inter-cooling heat exchanger 66 to be easily integrated into engine 10. The need for heavy and complex ducting and heat exchangers is eliminated. Reverse duct 46 and exhaust duct 40 provide easily accessible platforms on which to mount heat exchanger 66 without the need for additional ductwork. Heat exchanger 66 comprises valves and other plumbing components to selectively route portions of exhaust air $A_E$ within exhaust duct 40 past portions of core air $A_C$ within reverse duct 46 to perform inter-cooling.

Similarly, heat exchanger 66 can be operated in a reverse mode to perform recuperation. Recuperation involves heating compressed air within engine 10 before combustion. More specifically, one method of recuperation involves heating compressed air from high pressure compressor 36 with exhaust air $A_E$. In the embodiment shown, heat exchanger 66 is positioned aft of exhaust pipe 48 and augmenter 68 to be able to recuperate heat generated in combustor section 18 and augmenter 68. Recuperation increases fuel efficiency by reducing the amount of heat that combustor section 18 must provide. Furthermore, recuperation reduces the demands on compressors 26 and 36 as potential energy is added to the compressed air by the heat. Recuperation is particularly useful at cruising speeds where components of engine 10 are not challenged by temperature limitations. As with inter-cooling, conventional recuperation systems require additional ductwork and heat exchangers. The proximity of reverse duct 46 and exhaust duct 40 in the present invention provides a platform upon which heat exchanger 66 is easily integrated to perform both inter-cooling and recuperation. To perform recuperation, heat exchanger 66 operates to direct portions of exhaust air $A_E$ within exhaust duct 40 past portions of core air $A_C$ within reverse duct 46 in a reverse manner as compared to inter-cooling operations.

Exhaust duct 40 of engine 10 also provides advantages in the engine architecture of the present invention. Exhaust duct 40 provides a platform upon which an augmentation system can be mounted. For example, augmenter 68 is mounted on exhaust duct 40 between inner cowling 50 and outer cowling 52. Augmenter 68 carries out a secondary combustion process in exhaust air $A_E$ to further increase the velocity and mass of exhaust air $A_E$, as is known in the art. In one embodiment of the invention, augmenter 68 includes fuel spray bars or spray rings, flame holders, igniters, augmentation liners, valves and other plumbing for operating augmented combustion. Fuel spray bars or rings inject fuel into exhaust air $A_E$, which is ignited with an igniter after mixing with oxygen present in exhaust air $A_E$, thereby further increasing its velocity and mass. Flame holders produce local turbulence downstream of fuel spray bars to maintain flame stability. Augmenter 68 may also include augmentation liners and other protective shielding that prevents heat damage to exhaust duct 40. Augmenter 68 can be positioned anywhere within exhaust duct 40 between exhaust pipe 48 and the outlet of duct 40. In other embodiments augmenter 68 can be positioned aft of exhaust duct 40. However, positioning augmenter 68 within exhaust duct 40 near exhaust pipe 48 has several advantages. First, the size of engine 10 need not be increased with augmenter 68 within exhaust duct 40. Neither the radial nor axial dimensions of engine 10 need to increase to accommodate an augmentation system. This is particularly advantageous for military engines where aircraft size and length is of concern. Furthermore, with augmenter 68 within duct 40, the line-of-sight of augmented combustion is concealed within engine 10 to reduce the noise, IR and radar signatures of engine 10.

In a conventional axial flow spool, the compressor and turbine produce axially opposing forces. Thus, the shaft connecting the compressor and turbine is put into tension, and the loading on the spool is borne by conventional bearings. However, in the counter flow spool design of engine 10, low pressure turbine 30 and low pressure compressor 26 both produce axial forces that push low pressure spool 14 in the axially forward direction. Engine 10 is provided with a thrust reactor system to counteract these axially forward forces. For example, bearings are positioned at various places along fan shaft 22, low pressure shaft 28, gear shaft 25, high pressure shaft 34 and other places to support low pressure spool 14. Specifically, low pressure shaft 28 is provided with bearings 70A, 70B and 70C to counteract forces generated by low pressure spool 14. High pressure shaft 34 is supported by bearings 72A and 72B to counteract forces generated by high pressure turbine 32 and compressor 36. Similarly, fan shaft 22 is provided with bearings 74A and 74B to counteract forces generated by fan drive gear system 12. Bearings 70A-70C, 72A and 72B, and 74A and 74B are supported within engine 12 by various support struts connected to stationary components within engine 10, such as compressor case 43 or engine case 44. For example, bearings 74A and 74B are supported by inlet guide vane 58A. Bearings 70A-70C, and 74A and 74B are configured to absorb forward oriented thrust. In one embodiment, bearings 70A, 70B and 70C, and 74A and 74B comprise large-capacity tapered roller bearings. Furthermore, shaft 28 can be provided with balance piston 80 to apply additional counter force to low pressure spool 14 in addition to what is provided by bearings 70A-70C. Balance piston 80 can be anchored to a stationary component within engine 10, such as support struts for bearings 70A and 70B, and oriented to apply rearward axial force to shaft 28.

Thus, the architecture of engine 10 provides advantages in structure and performance over other engine architectures. Reductions in the weight of low pressure shaft 28, and high pressure spool 16 offset weight increases from exhaust duct 40 and reverse duct 46. Additionally, the performance benefits of having larger fan blades and a smaller high pressure spool with efficient pressure ratios outweigh the performance concerns relating to duct losses, compressor stability issues, and shaft loading. Furthermore, structural stability on engine 10 resulting from exhaust duct 40 and reverse duct 46 and shortening of shafts within engine 10 provide further benefits, including the ability to easily mount subsystems within engine 10. As such, the fan drive gear system and reversed-flow core architecture of the present invention achieve advancements and improvements in the efficiency and structure of turbofan engines.

Figure 2:
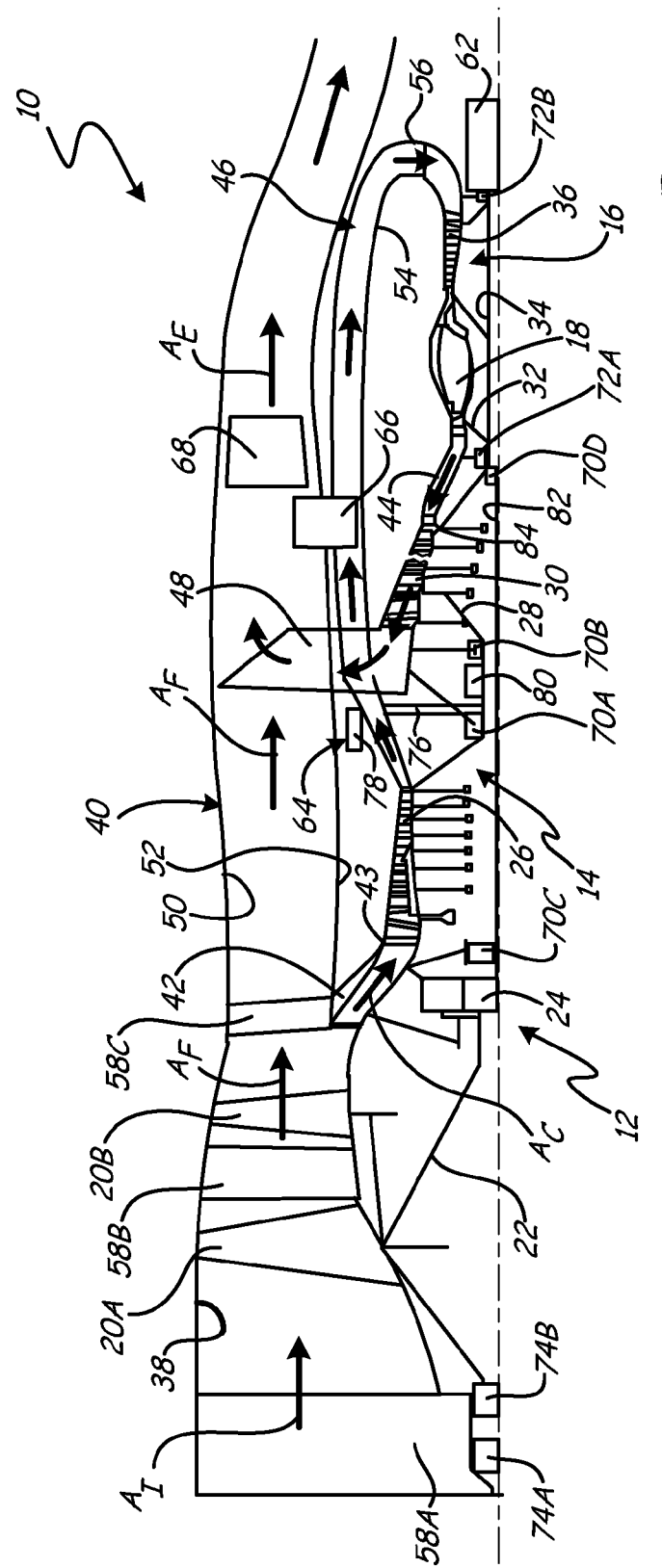
FIG. 2 is a schematic cross-sectional view of a three spool turbofan engine having a reversed flow axial core.

FIG. 2 is a schematic cross-sectional view of three spool turbofan engine 10 having fan drive gear system 12, cross-flow low pressure spool 14, reversed-flow high pressure spool 16 and combustor section 18. In the 3.0 spool configuration, each spool is directly driven by a turbine to form three full spools. Fan drive gear system 12 includes fan blades 20A and 20B, fan shaft 22, gearbox 24 and gear shaft 82, which are driven by intermediate pressure turbine 84. Cross-flow low pressure spool 14 includes low pressure compressor 26 and low pressure shaft 28, which are driven by low pressure turbine 30. Reversed-flow high pressure spool 16 includes high pressure shaft 34 and high pressure compressor 36, which are driven by high pressure turbine 32. As such, turbofan engine 10 comprises a 3.0 spool engine: two spools represented by cross-flow low pressure spool 14 and reversed-flow high pressure spool 16, and a full spool represented by fan drive gear system 12.

Using various ductwork, turbofan engine 10 routes air and gas through fan drive gear system 12, low pressure spool 14 and high pressure spool 16 to efficiently produce thrust in a radially and axially compact engine architecture, similar to that of FIG. 1. The 3.0 spool configuration of FIG. 2, however, enables even greater flexibility in designing and operating engine 10. In FIG. 2, gear shaft 25 of FIG. 1, which connects gearbox 24 to low pressure compressor 26, is replaced with gear shaft 82. Gear shaft 82 connects gearbox 24 directly to turbine 84. Turbine 84 comprises a third turbine within engine 10 disposed between high pressure turbine 32 and low pressure turbine 30. In the embodiment shown, turbine 30 is shortened to accommodate turbine 84, as low pressure spool 14 need not power gearbox 24. The number of turbines used in engine 10 and the specific length, or number of stages, in each turbine, however, can be selected based on desired performance parameters of engine 10. For example, a 3.0 spool system reduces the mass of each spool as compared to a 2.5 spool system. Reduced mass enables better acceleration of each spool as well as reducing the need for variable geometry vanes and blades. Thus, the output of turbines 30, 32 and 84 can more easily and more rapidly matched to the needs of compressor 26, compressor 36 and fan 38, respectively.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
    a fan drive gear system comprising:
        a turbofan;
        a fan shaft connected to an inner diameter of the turbofan; and
        an epicyclic gear system connected to a downstream end of the fan shaft;
    a low spool connected to the fan drive gear system, the low spool comprising:
        a rearward-flow low pressure compressor disposed aft of the fan drive gear system; and
        a forward-flow low pressure turbine disposed aft of the rearward-flow low pressure compressor;
    a high spool disposed aft of the low spool, the high spool comprising:
        a forward-flow high pressure turbine disposed aft of the forward-flow low pressure turbine;
        a combustor disposed aft of the forward-flow high pressure turbine; and
        a forward-flow high pressure compressor disposed aft of the combustor;
    a reverse ducting disposed radially outward of the high spool for directing output of the rearward-flow low pressure compressor to the forward-flow high pressure compressor such that the output reverses flow to pass through the high spool;
    exhaust ducting disposed radially outward of the reverse ducting for receiving exhaust gas from the forward-flow low pressure turbine and fan air from the turbofan: and
    an intercooling and recuperating heat exchanger mounted adjacent the reverse ducting between the rearward-flow low pressure compressor and the forward-flow high pressure compressor;
    wherein flow through the engine extends sequentially through the rearward-flow low pressure compressor in a downstream direction, and through the forward-flow high pressure compressor, the combustor, the forward-flow high pressure turbine and the forward-flow low pressure turbine in a forward direction.

2. The gas turbine engine of claim 1 and further comprising:
a low pressure shaft comprising:
a forward portion connected to the epicyclic gear system;
a mid portion connected to the rearward-flow low pressure compressor; and
an aft portion connected to the forward-flow low pressure turbine; and
a high pressure shaft disposed axially downstream of the low pressure shaft, the high pressure shaft comprising:
a forward portion connected to the forward-flow high pressure turbine;
a mid portion extending concentrically through the combustor; and
an aft portion connected to the forward-flow high pressure compressor.

3. The gas turbine engine of claim 2 and further comprising an accessory gearbox extending axially from a downstream end of the high pressure shaft.

4. The gas turbine engine of claim 3 and further comprising an accessory gearbox extending radially from the low pressure shaft using a tower shaft.

5. The gas turbine engine of claim 2 and further comprising a balance piston and a tapered roller bearing connected to the low pressure shaft to react axially forward directed thrust on the low pressure spool.

6. The gas turbine engine of claim 1 and further comprising:
an intermediate pressure turbine disposed between the forward-flow low pressure turbine and the forward-flow high pressure turbine;
a gear shaft connecting the epicyclic gear system to the intermediate pressure turbine;
a low pressure shaft comprising:
a forward portion connected to the rearward-flow low pressure compressor; and
an aft portion connected to the forward-flow low pressure turbine; and
a high pressure shaft disposed axially downstream of the low pressure shaft, the high pressure shaft comprising:
a forward portion connected to the forward-flow high pressure turbine;
a mid portion extending concentrically through the combustor; and
an aft portion connected to the forward-flow high pressure compressor.

7. The gas turbine engine of claim 1 and further comprising:
an annular exhaust duct for guiding fan air from the turbofan;
a flow splitter disposed within the exhaust duct to divert a portion of the fan air to the rearward-flow low pressure compressor to produce a downstream flow of low pressure air;
a core engine case surrounding the high spool;
a reverse flow duct disposed concentrically between the exhaust duct and the core engine case, the reverse flow duct comprising:
an inlet end configured to receive downstream flow of the low pressure air from the rearward-flow low pressure compressor;
an elbow connected to the inlet end and configured to redirect downstream flow of the low pressure air into upstream flow; and
an outlet end connected to the elbow and configured to direct upstream flow of the low pressure air into the forward-flow high pressure compressor; and
an exhaust vent comprising:
an inlet configured to receive gas from the core engine case; and
an outlet configured to discharge gas into the annular exhaust duct.

8. The gas turbine engine of claim 1 wherein the forward-flow high pressure compressor comprises an axial flow compressor.

9. A turbofan engine comprising:
a turbofan propulsor for producing downstream flowing bypass gas and core gas;
a low pressure spool comprising:
a low pressure compressor for receiving downstream flowing core gas from the turbofan propulsor; and
a low pressure turbine having upstream flow;
a gear reduction system for coupling the turbofan propulsor to an input rotation;
a reverse air duct for turning downstream flowing core gas from the low pressure compressor radially inward for upstream flow;
a reversed-flow core with upstream flow configured to receive upstream flowing core gas from the air duct and to deliver upstream flowing core gas to the low pressure turbine;
an exhaust pipe for turning upstream flow of core gas from the low pressure turbine radially outward for discharge into the downstream flow of bypass gas; and
an intercooling and recuperating heat exchanger mounted adjacent the reverse air duct between the low pressure compressor and the reversed-flow core.

10. The turbofan engine of claim 9 wherein the reversed-flow core includes an axial flow high pressure turbine and an axial flow high pressure compressor.

11. The turbofan engine of claim 10 and further comprising:
a fan shaft for connecting the turbofan propulsor to the gear reduction system;
a low pressure shaft for connecting the low pressure compressor to the low pressure turbine; and
a high pressure shaft for connecting the high pressure compressor to the high pressure turbine.

12. The turbofan engine of claim 11 and further comprising a gear shaft for connecting the gear reduction system to the cross-flow low pressure spool, the gear shaft providing the input rotation.

13. The turbofan engine of claim 11 and further comprising:
an intermediate pressure turbine disposed between the low pressure turbine and the high pressure turbine; and
a gear shaft for connecting the gear reduction system to the intermediate pressure turbine, the gear shaft providing the input rotation.

14. A gas turbine engine comprising:
a fan drive gear system comprising:
a turbofan;
a fan shaft connected to an inner diameter of the turbofan; and
an epicyclic gear system connected to a downstream end of the fan shaft;
a low spool connected to the fan drive gear system, the low spool comprising:
a low pressure shaft;
a rearward-flow low pressure compressor disposed aft of the fan drive gear system; and a forward-flow low pressure turbine disposed aft of the rearward-flow low pressure compressor;
a high spool disposed aft of the low spool, the high spool comprising:
a forward-flow high pressure turbine disposed aft of the forward-flow low pressure turbine;
a combustor disposed aft of the forward-flow high pressure turbine; and
a forward-flow high pressure compressor disposed aft of the combustor;
reverse ducting disposed radially outward of the high spool for directing output of the rearward-flow low pressure compressor to the forward-flow high pressure compressor such that the output reverses flow to pass through the high spool;
exhaust ducting disposed radially outward of the reverse ducting for receiving exhaust gas from the forward-flow low pressure turbine and fan air from the turbofan; and
an augmenter mounted within the exhaust ducting radially outward of the high pressure spool;
wherein flow through the engine extends sequentially through the rearward-flow low pressure compressor in a downstream direction, and through the forward-flow high pressure compressor, the combustor, the forward-flow high pressure turbine and the forward-flow low pressure turbine in a forward direction; and
wherein an accessory gearbox extending radially from the low pressure shaft using a tower shaft.

15. The gas turbine engine of claim 14 and further comprising:
the low pressure shaft comprising:
a forward portion connected to the epicyclic gear system;
a mid portion connected to the rearward-flow low pressure compressor;
and an aft portion connected to the forward-flow low pressure turbine; and
a high pressure shaft disposed axially downstream of the low pressure shaft, the high pressure shaft comprising:
a forward portion connected to the forward-flow high pressure turbine;
a mid portion extending concentrically through the combustor; and
an aft portion connected to the forward-flow high pressure compressor.

16. The gas turbine engine of claim 15 and further comprising an accessory gearbox extending axially from a downstream end of the high pressure shaft.

17. The gas turbine engine of claim 15 and further comprising a balance piston and a tapered roller bearing connected to the low pressure shaft to react axially forward directed thrust on the low pressure spool.

18. The gas turbine engine of claim 14 and further comprising:
an intermediate pressure turbine disposed between the forward-flow low pressure turbine and the rearward-flow high pressure turbine;
a gear shaft connecting the epicyclic gear system to the intermediate pressure turbine;
a low pressure shaft comprising:
a forward portion connected to the rearward-flow low pressure compressor; and
an aft portion connected to the forward-flow low pressure turbine; and
a high pressure shaft disposed axially downstream of the low pressure shaft, the high pressure shaft comprising:
a forward portion connected to the forward-flow high pressure turbine;
a mid portion extending concentrically through the combustor; and
an aft portion connected to the forward-flow high pressure compressor.

19. The gas turbine engine of claim 14 and further comprising:
an annular exhaust duct for guiding fan air from the turbofan;
a flow splitter disposed within the exhaust duct to divert a portion of the fan air to the rearward-flow low pressure compressor to produce a downstream flow of low pressure air;
a core engine case surrounding the high spool;
a reverse flow duct disposed concentrically between the exhaust duct and the core engine case, the reverse flow duct comprising:
an inlet end configured to receive downstream flow of the low pressure air from the rearward-flow low pressure compressor;
an elbow connected to the inlet end and configured to redirect downstream flow of the low pressure air into upstream flow; and
an outlet end connected to the elbow and configured to direct upstream flow of the low pressure air into the forward-flow high pressure compressor; and
an exhaust vent comprising:
an inlet configured to receive gas from the core engine case; and
an outlet configured to discharge gas into the annular exhaust duct.

20. A turbofan engine comprising:
a turbofan propulsor for producing downstream flowing bypass gas and core gas;
a low pressure spool comprising:
a low pressure shaft;
a low pressure compressor for receiving downstream flowing core gas from the turbofan propulsor; and
a low pressure turbine having upstream flow;
a gear reduction system for coupling the turbofan propulsor to an input rotation;
an air duct for turning downstream flowing core gas from the low pressure compressor radially inward for upstream flow;
a reversed-flow core with upstream flow configured to receive upstream flowing core gas from the air duct and to deliver upstream flowing core gas to the low pressure turbine;
an exhaust pipe for turning upstream flow of core gas from the low pressure turbine radially outward for discharge into the downstream flow of bypass gas; and an augmenter mounted within an exhaust duct
radially outward of the reversed-flow core;
wherein an accessory gearbox extending radially from the low pressure shaft using a tower shaft.

* * * * *

UNITED STATES PATENT AND TRADEMARK OFFICE
CERTIFICATE OF CORRECTION

PATENT NO. : 8,176,725 B2
APPLICATION NO. : 12/556359
DATED : May 15, 2012
INVENTOR(S) : James W. Norris et al.

It is certified that error appears in the above-identified patent and that said Letters Patent is hereby corrected as shown below:

Title Page: Item (75) Inventors:
Delete "Jams W. Norris"
Insert --James W. Norris--

Signed and Sealed this
Fourteenth Day of August, 2012

David J. Kappos
*Director of the United States Patent and Trademark Office*